(12) United States Patent
Miliani (10) Patent No.: US 10,468,877 B2
(45) Date of Patent: Nov. 5, 2019

(54) CONTINUOUS-POWER ELECTRICAL SYSTEM STABILIZED BY INTEGRATED ACTIVE FILTERS

(71) Applicant: IFP Energies Nouvelles, Rueil-Malmaison (FR)

(72) Inventor: El Hadj Miliani, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 1057 days.

(21) Appl. No.: 14/051,518

(22) Filed: Oct. 11, 2013

(65) Prior Publication Data

US 2014/0111001 A1   Apr. 24, 2014

(30) Foreign Application Priority Data

Oct. 18, 2012   (FR) ..................................... 12 02804

(51) Int. Cl.
| | | |
|---|---|---|
| *H02J 1/00* | (2006.01) | |
| *H02M 1/15* | (2006.01) | |
| *H02P 21/00* | (2016.01) | |

(52) U.S. Cl.
CPC ................. *H02J 1/00* (2013.01); *H02M 1/15* (2013.01); *H02P 21/00* (2013.01); *Y10T 307/352* (2015.04)

(58) Field of Classification Search
CPC ..... G06F 1/26; H01R 25/003; Y02T 10/7077; Y02T 10/7005; Y02T 10/70; B60R 16/03; B60R 16/0315; B60W 10/08; B60W 20/00; H02J 1/00; H02J 3/24; H02J 3/04; H02J 3/1807; H02J 3/14; H02M 1/15; H02P 21/00; H02P 9/105; Y10T 307/352; H02H 9/08; Y02B 70/3225; Y04S 20/222

USPC .............................. 307/102, 38, 9.1; 318/139
See application file for complete search history.

(56) References Cited

U.S. PATENT DOCUMENTS

| 3,849,677 A | 11/1974 | Stacey et al. | |
|---|---|---|---|
| 3,935,512 A * | 1/1976 | Falk ......................... | H02M 1/15 324/500 |
| 4,685,044 A * | 8/1987 | Weibelzahl ............. | H02M 1/12 363/35 |

(Continued)

FOREIGN PATENT DOCUMENTS

| CN | 1106175 A | 8/1995 |
|---|---|---|
| CN | 201134784 Y | 10/2008 |

(Continued)

OTHER PUBLICATIONS

Chinese Office Action issued by State Intellectual Property Office of China, dated Nov. 1, 2016, issued against Patent Application No. 201310487975.7 [English translation included].

(Continued)

*Primary Examiner* — Thienvu V Tran
*Assistant Examiner* — Brian K Baxter
(74) *Attorney, Agent, or Firm* — Fitch, Even, Tabin & Flannery LLP (57) ABSTRACT

The invention is an electrical system comprising an electrical source, an electrical device (4), a capacitor (2') and a controlled active filter (7, L) providing stabilization of the electrical quantities. The active filter (7, L) is mounted in parallel with a capacitor (2') of reduced capacity in relation to conventional means. Active filter (7, L) is at least partly integrated within electrical device (4).

30 Claims, 11 Drawing Sheets

(56) References Cited

U.S. PATENT DOCUMENTS

| | | | | |
|---|---|---|---|---|
| 5,504,667 A * | 4/1996 | Tanaka | H02M 5/4505 | 363/37 |
| 6,304,465 B1 * | 10/2001 | Takita | H02M 1/4225 | 323/222 |
| 6,424,207 B1 * | 7/2002 | Johnson | H02M 1/15 | 327/552 |
| 9,124,095 B1 * | 9/2015 | Barron | H02H 7/122 | |
| 9,219,406 B1 * | 12/2015 | Alexander | H02M 1/08 | |
| 9,397,580 B1 * | 7/2016 | Alexander | H02M 3/1582 | |
| 9,407,133 B1 * | 8/2016 | Alexander | H02M 1/12 | |
| 9,431,888 B1 * | 8/2016 | Alexander | H02M 5/225 | |
| 9,641,008 B2 * | 5/2017 | Gati | B60L 11/1816 | |
| 2003/0123567 A1 * | 7/2003 | Shigemasa | G06K 19/0723 | 375/295 |
| 2004/0079173 A1 * | 4/2004 | Neely | H02P 6/10 | 73/862.333 |
| 2004/0141275 A1 * | 7/2004 | Athari | H02M 1/15 | 361/118 |
| 2006/0027019 A1 * | 2/2006 | Ito | G01C 19/5719 | 73/504.12 |
| 2007/0086222 A1 * | 4/2007 | Iida | H02J 7/022 | 363/37 |
| 2008/0013351 A1 * | 1/2008 | Alexander | H02M 3/1582 | 363/123 |
| 2008/0024951 A1 * | 1/2008 | Mortensen | H02M 1/44 | 361/118 |
| 2008/0278229 A1 * | 11/2008 | Grundl | H02M 1/15 | 327/559 |
| 2010/0013438 A1 * | 1/2010 | Anwar | B60L 11/1816 | 320/138 |
| 2010/0060226 A1 * | 3/2010 | Ide | H02P 6/10 | 318/611 |
| 2010/0085784 A1 * | 4/2010 | Chou | H02M 1/14 | 363/45 |
| 2011/0044217 A1 * | 2/2011 | Wu | H04L 5/14 | 370/294 |
| 2011/0084648 A1 * | 4/2011 | Cao | H01M 10/44 | 320/103 |
| 2011/0292697 A1 * | 12/2011 | Alexander | H02M 5/275 | 363/37 |
| 2012/0014151 A1 * | 1/2012 | Alexander | H02M 5/225 | 363/123 |
| 2013/0021953 A1 * | 1/2013 | Yilmazer | H04L 5/143 | 370/282 |
| 2013/0063994 A1 * | 3/2013 | Alexander | H02M 5/225 | 363/123 |
| 2013/0070501 A1 * | 3/2013 | Sardat | H02M 5/06 | 363/126 |
| 2013/0234675 A1 * | 9/2013 | King | B60L 11/1814 | 320/163 |
| 2015/0003115 A1 * | 1/2015 | Barron | H02M 1/08 | 363/17 |
| 2015/0055387 A1 * | 2/2015 | Tengner | H02M 1/15 | 363/132 |
| 2015/0061569 A1 * | 3/2015 | Alexander | B60L 11/1809 | 320/101 |

FOREIGN PATENT DOCUMENTS

| | | |
|---|---|---|
| CN | 101436840 A | 5/2009 |
| CN | 102510229 A | 6/2012 |
| EP | 0 642 211 A2 | 3/1995 |

OTHER PUBLICATIONS

Nicolas Patin, et al: Impact des Strategies de Controle et des Topologies D'Onduleur sur la Stabilisation du bus Continu dans les Systemes Embarquées. Conference EF 2009, UTC, Compiègne, Sep. 24-25, 2009, 10 pgs. (ISBN 978-2-913923-30-0).

T. Dung Nguyen, et al: "Analyse des Sollicitations sur les Condensateurs de Filtrage du bus Continu D'Onduleur Pour Applications Embarquées." Workshop 2emc 2010. Universite de Technologie de Compiègne, Laboratoire d'Electromécanique, Centre de Recherche, BP 20529, 60205 Compiégne, France. 6 pages.

Ahmed-Bilal Awan et al: "Nonlinear Stabilization of a DC-Bus Supplying a Constant Power Lead". IEEE, 2009. 8 pages.

* cited by examiner

CONTINUOUS-POWER ELECTRICAL SYSTEM STABILIZED BY INTEGRATED ACTIVE FILTERS

CROSS REFERENCE TO RELATED APPLICATION

Reference is made to French Application Serial No. 12/02.804, filed Oct. 18, 2012, which application is incorporated herein by reference in its entirety.

BACKGROUND OF THE INVENTION

Field of the Invention

Figure 1:
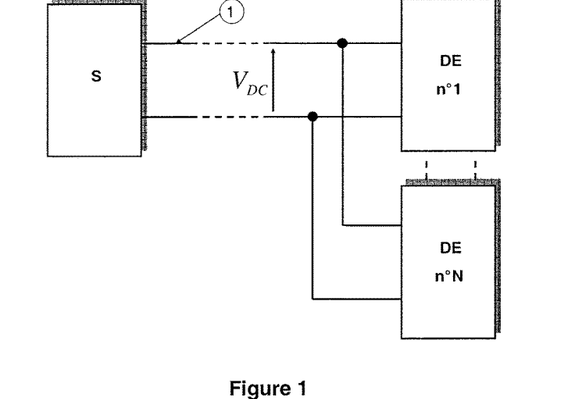
FIG. 1, already described, illustrates a distributed electrical power system.

The present invention relates to optimization of continuous-power electrical networks, notably on-board vehicles. Nowadays, developing architectures of on-board electrical networks with distributed continuous power concerns many fields of activity such as the car industry, the railway construction, the shipbuilding industry or the aircraft industry. It is therefore necessary to find reliable, compact and inexpensive solutions in order to optimize these systems. Although it is possible to connect several electrical devices (DE), also referred to as loads, of different natures, to a common dc bus (1) (FIG. 1), the interactions between these electrical devices DE can lead to an unstable behavior of the system.

Description of the Prior Art

Indeed, some electrical devices DE such as, for example, those of an assembly, an inverter (3) and an electrical machine (4) modify the harmonic content of the continuous quantities, that is the current and the voltage. It may therefore be necessary to reduce or even to eliminate the harmonic effects caused by the switching of the inverter according to PWM techniques. Pulse Width Modulation is a technique commonly used for synthesizing alternating signals using on-off circuits. This type of system involves two fundamental constraints which are the stability and the quality of the on-board energy. Controlling these two constraints thus allows reduction of the size (volume and weight) of these systems and to best control the quantities that guarantee an increased life of the power source elements such as, for example, a battery in the case of a motor vehicle.

Figure 2:
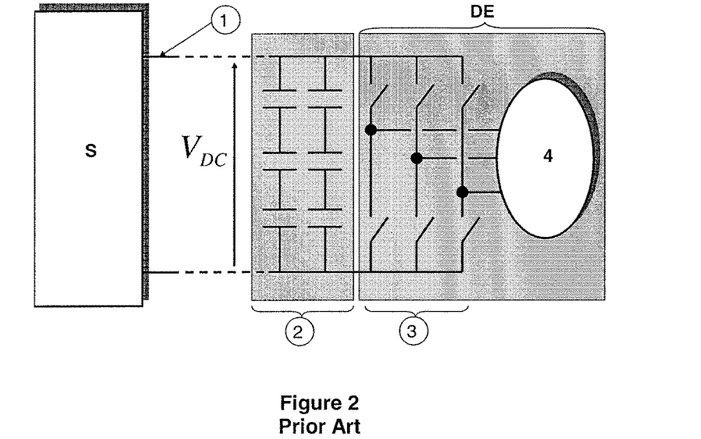
FIGS. 2 and 3, already described, show an electrical system according to the prior art.

In response to the above problem, a widespread solution is using high-capacity "capacitor assemblies" (2) which are a combination of capacitors in series as shown in the Prior Art of FIG. 2 and in parallel whose purpose is to provide passive filtering allowing absorption of the harmonics. These capacitors are generally arranged directly upstream from inverters (3) and are sized to obtain a very good quality of the energy and the dc bus voltage as shown in FIG. 2.

The following documents describe the use of "capacitor assemblies":

Nicolas PATIN, Dung NGUYEN, and Guy FRIEDRICH. Impact des stratégies de contrôle et des topologies d'onduleur sur la stabilisation du bus continu dans les systèmes embarqués. Conference EF, September 2009.

Dung NGUYEN, Nicolas PATIN, and Guy FRIEDRICH. Analyse des sollicitations sur les condensateurs de filtrage du bus continu d'onduleur pour applications embarquées. Workshop, 2010.

Now, in order to guarantee these performances, these high-capacity capacitor assemblies (2) are bulky and represent approximately one third of the volume and of the cost of the power inverters. It is therefore necessary to try to reduce these passive elements while controlling the two main constraints which are stability and quality of the continuous network.

Figure 3:
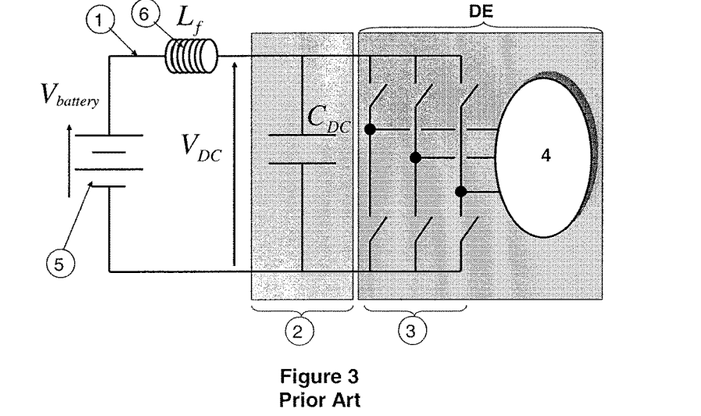

In a simple manner, stability can be defined as the fact that the state quantities of a system remain "close" to an operating point defined for example by their state of equilibrium even though the system undergoes external disturbances. The influence of the capacity value on a system having a battery (5) (input voltage source), a filter capacitor $C_{dc}$ (2) an assembly made up of an inverter (3) and an electrical machine (4) is studied to illustrate the connection between the value of the capacitor and the stability problem. The leakage inductance $L_f$ due to wire windings is modelled by an inductance (6) between the source and the capacitor of the equivalent bus as shown in FIG. 3.

When the capacity is low (100 µF for example) and the leakage inductance is high, the interaction between the filter $L_f$-$C_{dc}$ and the inverter-machine assembly causes a stability loss. On the other hand, a high capacity (for example ten times as high) provides stability in the system. It is noted that the capacity of the capacitor depends on the size thereof and therefore a high capacity requires a large volume.

On the other hand, if the leakage inductance due to wire windings (not controllable) is relatively low, stability is provided but the amplitude of the fluctuations linked with the modulation caused by the switching of the inverter is increased.

These results show that the dc bus capacitor serves a dual purpose. First of all, it eliminates stability loss risk by reducing the area of interaction between the filter ($L_f$-$C_{dc}$) and the load. It also allows great attenuation of the undulation amplitude variations ensuring practically smooth continuous quantities. Therefore, any decrease in the size of these passive elements must be accompanied by a corrective action for stabilizing and reducing the fluctuations of the electrical quantities of the dc bus.

In order to reduce the size of electrical systems, the power electronics are increasingly integrated into the electrical machine. However, although this is possible for the switches of the inverter, which are then arranged on the stator of the electrical machine, it is more complicated with all of the capacitors. Indeed, these passive elements cannot be totally integrated into the machine, and the only way to have a power electronics integrated into the machine is setting them on the machine, and they thus maintain their weight, volume and dependability. Furthermore, integration of all the capacitors also causes problems linked with the chemical elements of the capacitor. In fact, capacitors are chemically constructed and they are sensitive to severe operating conditions such as vibrations. Therefore, using "capacitor assemblies" does not enable entire integration of the power electronics within the electrical device.

SUMMARY OF THE INVENTION

The electrical system according to the invention is based on the use of a controlled active filter providing stabilization of the electrical quantities. The active filter is mounted in parallel with a capacitor of reduced capacity in relation to conventional techniques. Furthermore, the active filter is at least partly integrated within the electrical device. Thus, a volume and weight decrease is obtained while keeping a quality and stability of the on-board electrical energy. The invention also allows the cost of such a system to be reduced.

The invention relates to an electrical system comprising at least one continuous-power electrical energy source, at least one electrical device connected to the source and a capacitor connected in parallel with the electrical device. The electrical system also comprises a controlled active filter between the source and the electrical device, for injecting or absorbing fluctuations of the current $i_e$ provided by the source and for reducing the fluctuations of voltage $v_{DC}$ at the terminals of the source with the active filter being at least partly integrated within the electrical device.

According to the invention, the capacitor is arranged on the electrical device.

Advantageously, the electrical device comprises at least an inverter and an electrical machine with the active filter being at least partly integrated within the electrical machine.

Advantageously, the inverter comprises controlled switches arranged on the electrical machine.

According to one embodiment of the invention, the active filter has four controlled switches forming an H bridge and an inductor is arranged in parallel with the bridge and integrated within the electrical machine.

Alternatively, the active filter includes eight controlled switches forming two H bridges and of two inductors respectively arranged in parallel with one of the bridges and integrated within the electrical machine.

According to the machine, the switches are arranged on the electrical machine.

Advantageously, the switches are controlled by two feedback loops comprising a high-pass filter and a regulator with each feedback loop controlling two switches.

Preferably, the regulator is a hysteresis comparator.

Moreover, the active filter can be directly connected in parallel with the capacitor.

Advantageously, the control of the active filter depends on two variables that are the sign of the fluctuation of the inverter input current $\tilde{i}_{DC}$ and the undulations of the bus voltage $\tilde{v}_{DC}$.

According to an embodiment of the invention, the system comprises dynamic stabilization of current $i_e$ provided by the source and of voltage $v_{DC}$ at the terminals of the source.

Preferably, the dynamic stabilization corresponds to a feedback loop in the control of the electrical machine having the same effect as a resistor R that would be directly arranged in parallel with the capacitor and the active filter.

Furthermore, the feedback loop of the dynamic stabilization (11') can have a gain 1/R and of a low-pass filter.

The invention also relates to a vehicle, notably a hybrid or electrical vehicle, comprising an electrical system according to the invention.

BRIEF DESCRIPTION OF THE DRAWINGS

Other features and advantages of the method according to the invention will be clear from reading the description hereafter of embodiments given by way of non-limitative example, with reference to the accompanying figures wherein.

DETAILED DESCRIPTION OF THE INVENTION

Figure 4:
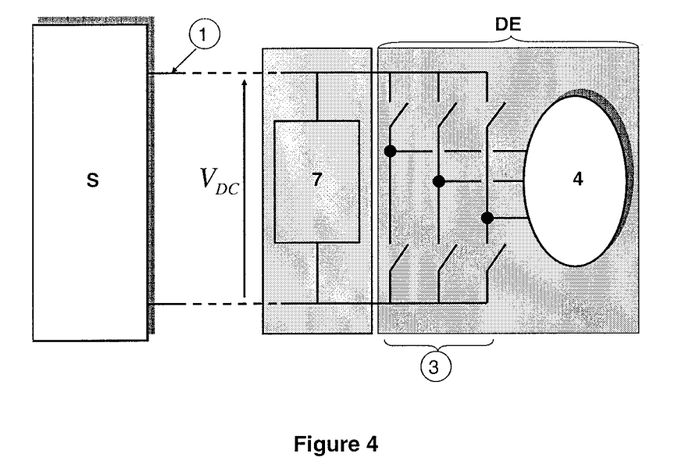
FIG. 4 illustrates an embodiment of the invention.

The electrical system according to the invention comprises at least one continuous-power electrical energy source S, at least one electrical device DE connected to the source and consuming a current $i_e$ provided by the source (S) and a voltage $v_{DC}$ at the terminals of the source S, a capacitor (2) is connected by electrical bus 1 in parallel with the electrical device DE to provide passive filtering and controlled active filter means (7 and 7') between the source S and the electrical device DE, for injecting or absorbing undulations of the current $i_e$ provided by the source and for reducing the fluctuations of voltage $v_{DC}$ at the terminals of the source (FIG. 4). Conventionally, electrical devices DE include an inverter (3) and an electrical machine (4). Electrical bus 1 connects the source S to the actual filter 7 and to inverter 3.

The invention can be on board a vehicle, notably a motor, railway or naval vehicle, hybrid or electric, but it is also suitable for any system operating with batteries.

Active filter (7 and 7') is understood to provide current filtering, allowing injection or absorption of the current fluctuations and the bus voltage fluctuations. These filters can be controlled, unlike passive filters. Passive filters only include capacitors, resistors and inductors that cannot be controlled. The active filters (7 and 7') associated with a capacitor (2') of reduced or even very reduced capacity in relation to conventional practice acts as the assembly of capacitors (2) used in the prior art. That is, they stabilize the current and the bus voltage while allowing the size of the capacitor assembly to be reduced. Conventionally, active filters (7 and 7') comprise controlled switches of very limited size. Capacitor (2') allows the fluctuations of bus voltage $v_{DC}$ to be reduced.

An electrical device DE is understood to be a device requiring a current and a voltage to operate. It can be an electrical machine (4) for driving the vehicle, or any electrical device that can be installed on board vehicles or powered by an electrical battery, such as steering devices, tools, compressors, etc. However, the description below and FIGS. 2 to 17 essentially relate to electrical devices made up of an electrical machine (4) and an inverter (3). Indeed, this type of electrical device DE is the one that most modifies the harmonic content of the continuous quantities provided by the source. Such an electrical machine (4) can be a three-phase synchronous electrical machine. Inverter (3) allows conversion of a continuous electrical signal into an alternating electrical signal notably suited for supplying an electrical machine. Conventionally, an inverter (3) includes three inverter arms (one for each phase of the three-phase electrical machine), and each inverter arm comprises two supplementary controlled switches. The control of these switches generally provides pulse width modulation (PWM).

An electrical energy source S is understood to be any source allowing supply of a current and a voltage. In the present case, essentially electrical batteries (5) supply continuous current and voltage to at least one electrical device DE.

In a preferred embodiment, the electrical device DE is connected to the source by a common dc bus (1) to which the active filter means (7 and 7') are also connected.

The purpose of active filter (7 and 7') is to allow injection and absorption of the fluctuations and therefore of the harmonics of the input current $i_{DC}$ of electrical device DE, and to reduce the fluctuations of the dc bus voltage $v_{DC}$ (equal to the voltage at the terminals of source S). The inverter input current $i_{DC}$ is the current circulating in electrical device DE. By applying the mesh law to the electrical diagram of FIG. 7, inverter input current $i_{DC}$ can be calculated as a function of the current supplied by source $i_e$, of the current circulating in capacitor $i_c$ and of the current circulating in active filter (7) such that $i_{filtre}:i_{DC}=i_e-i_c+i_{filtre}$.

Figure 6:
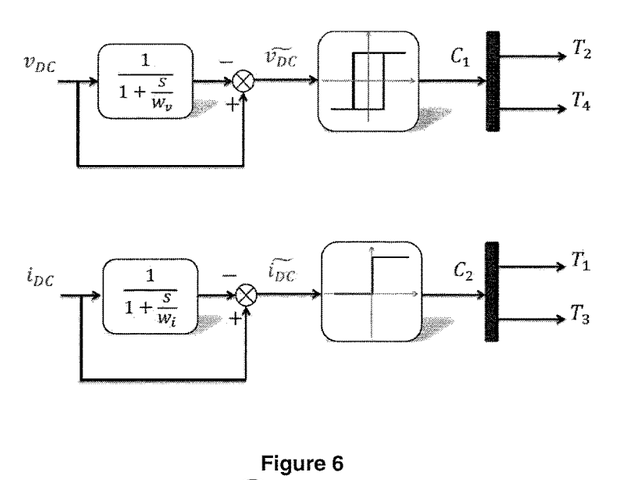
FIGS. 6 and 7 show an embodiment of the control of the first alternative embodiment of the invention.

According to a first alternative embodiment of the invention, the filter can have four controlled switches (T1 to T4) forming an H bridge and of an inductor (L) arranged in parallel with the bridge (FIG. 6). It then has the topology of a single-phase current inverter. It is thus bidirectional in voltage and current and it is directly connected in parallel with the reduced capacitor (2'). It allows injection of a current $i_{ind}$ via a current source having an inductor of inductance L.

Figure 5:
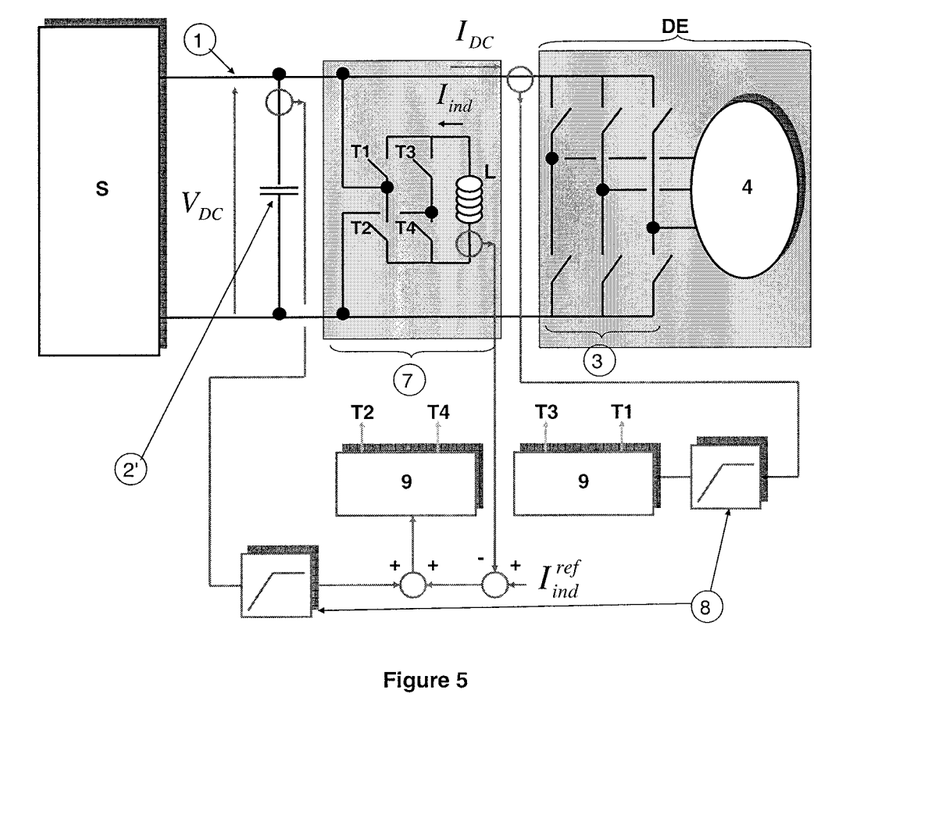
FIG. 5 shows a first alternative embodiment of the invention.
Figure 7:
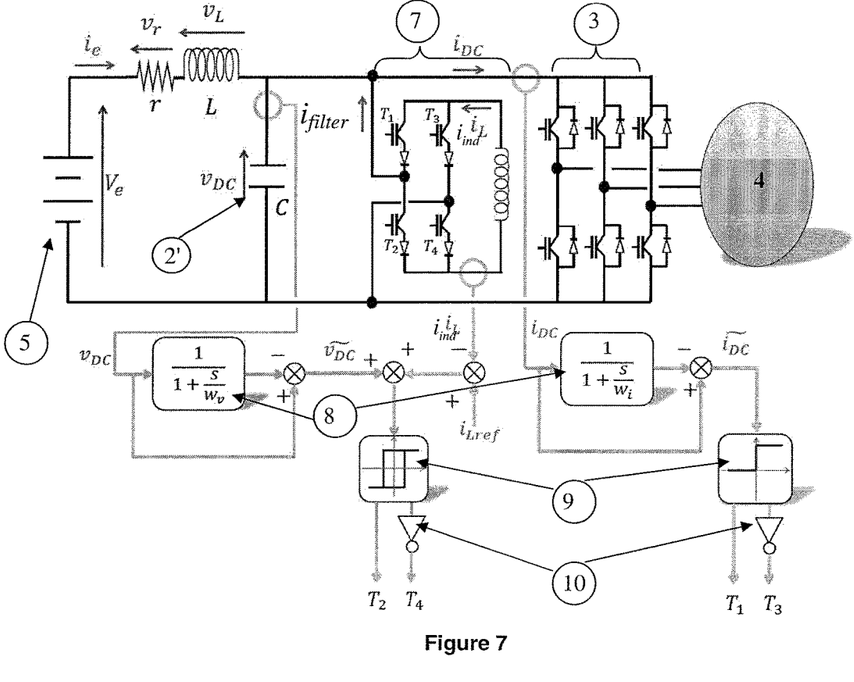

In the embodiment shown in FIGS. 5 to 7, current generation at the filter output is controlled by the two variables of the fluctuations of the dc bus voltage $\tilde{v}_{DC}$ and the undulations of the inverter input current $\tilde{i}_{DC}$. Voltage and current fluctuations are understood to be the variations of these quantities around their continuous components which undulations are denoted by $\tilde{i}$ and $\tilde{v}$.

Advantageously, control of switches T1 to T4 is achieved through two feedback loops comprising a high-pass filter (8) and a regulator (9) respectively (FIGS. 5, 6 and 7) with each feedback loop controlling two switches. Regulators (9) used in these feedback loops can be hysteresis comparators. The high-pass filters (8) used are characterized by their cutoff frequencies $w_i$ and $w_c$ that are determined so as to keep only the high-frequency undulations of voltage $v_{DC}$ and of current $i_{DC}$, of current $\tilde{i}_{DC}$ and of voltage $\tilde{v}_{DC}$.

It can be noted that the Laplace transform variable is denoted by s. Besides, $C_1$ and $C_2$ designate the control signals (on-off) from the feedback loops controlling active filter (7). These signals are applied directly or after inversion at switches T1 to T4.

Switches T2 and T4 only depend on the state of control $C_1$ and on the hysteresis limits being reached by bus voltage $v_{DC}$. The state change frequency of control $C_1$ thus depends on the rate of increase or of decrease of voltage $v_{DC}$ and on the width of the hysteresis band. It is therefore influenced by the value of the capacity of capacitor (2'). Indeed, the higher the capacity, the lower the voltage slope, which induces a lower hysteresis limit reaching frequency (9). However, if the capacity is low (below 100 µF for example), the switching frequency of switches T2 and T4 is increased and it can become impossible to achieve since the frequency also increases the switching losses. The value of the capacity of capacitor (2') thus has a direct influence on the active filter control topology, which limits the value of capacitor (2'). For example, a capacitor (2') of capacity above 100 µF seems acceptable. Indeed, for this capacity value, the required switching frequency is of the order of 100 kHz. It is noted that a 100 µF capacity leads to instability of the electrical system of the prior art.

Regulation of the inducing current to be injected $i_{ind}$ is achieved via the regulation of the dc bus voltage. The dc bus voltage at the terminals of reduced capacitor (2') can be used as a voltage source allowing regulation of current $i_{ind}$. Thus, in order to regulate the current at its theoretically determined constant value, the error obtained by: $i_{ind}^{ref}-i_{ind}$ is added to voltage fluctuations $\tilde{v}_{DC}$. With this approach, the hysteresis regulator allows correction of the inducing current error together with the confinement of voltage $v_{DC}$ in the hysteresis band. The regulation diagram is shown in FIG. 7. In this figure, reference (10) designates an inverting gate of an embodiment of the control of the system according to the invention:

when the fluctuation of current $\tilde{i}_{DC}$ is positive, that is, circulating through electrical device (DE), active filter (7) injects the inducing current $i_{ind}$ onto dc bus (1). The switches controlled by the control signals, T1 and T4, are therefore closed (T2 and T3 being open), when the fluctuation of $\tilde{i}_{DC}$ is negative, that is, injected onto bus (1), the active filter absorbs the current and consequently the switches controlled by T2 and T3 are closed (T1 and T4 being open), and two free wheel states are allowed (T1 and T2 closed or T3 and T4 closed) and enable an increase or a decrease bus voltage $v_{DC}$ at the terminals of capacitor (2') depending on whether it exceeds the specified undulation amplitude limits, for example of the hysteresis comparator.

Figure 16:
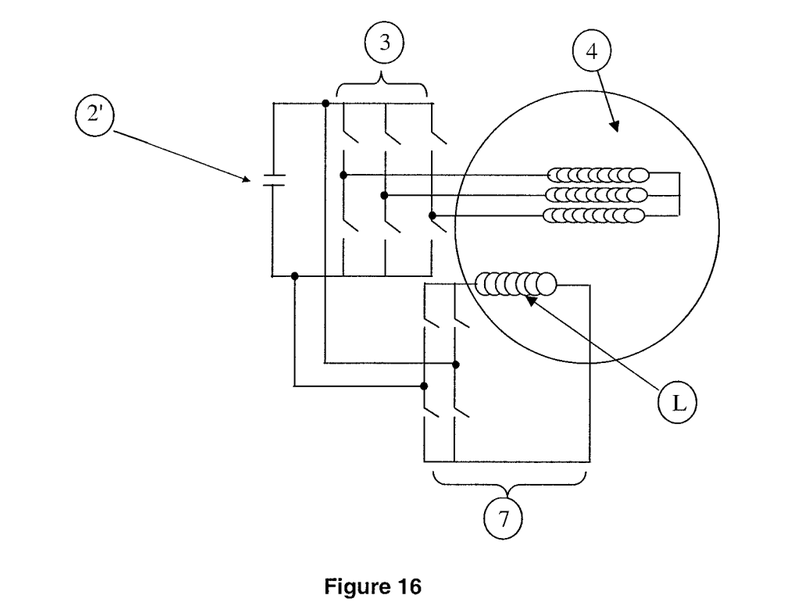
FIGS. 16 and 17 illustrate the integration of the components of the system according to the first alternative embodiment of the invention.

According to the invention, at least part and preferably all of the active filter is integrated within electrical device (DE). Thus, the size of the electrical system according to the invention is reduced, on the one hand, because capacitor (2') is reduced in size and, on the other hand, because the active filter is at least partly arranged in the volume of the electrical device (DE). A component is considered to be integrated in an element if the component is positioned in/on the element in such a way that the volume of the assembly (element and component) does not exceed the volume of the element alone. In the case of the embodiment of FIG. 5, several possible ways of integrating the active filter alone or in combination, can be considered:

inductor (L) is inserted within electrical machine (4), preferably close to the coils of the electrical machine. FIG. 16 illustrates this embodiment, switches (T1 to T4) of the active filter are arranged on the stator of electrical machine (4), which allows reduction notably of the wire elements between the power electronics and the electrical machine. This also allows the size of the electrical system to be limited, the switches of inverter arms (3) can also be arranged directly on the stator of electrical machine (4). The wire elements and the size of the electrical system are thus reduced, capacitor (2') is arranged directly on the stator of the electrical machine. Indeed, the dimensions of capacitor (2'), which are reduced as a result of the active filter in relation to capacitor (2) used in the prior art, make it possible to position capacitor (2') on the stator of electrical machine (4).

Figure 17:
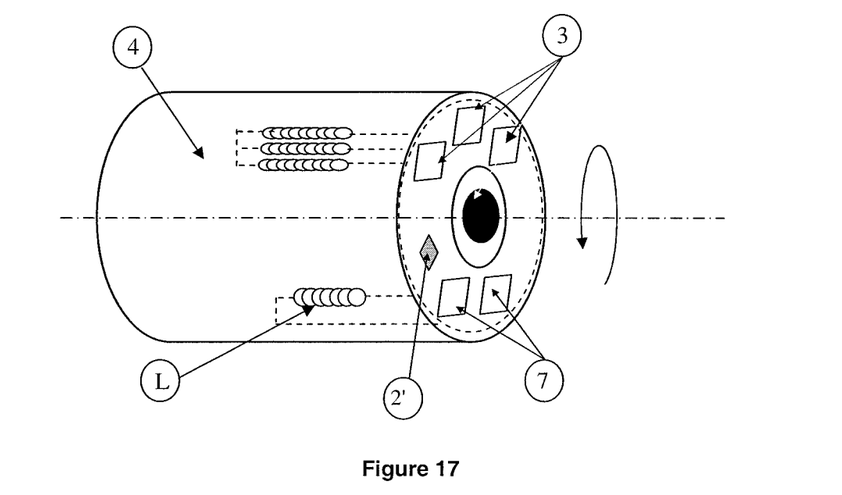

FIG. 17 illustrates an example of integration of the components in the electrical machine that accounts for all the aforementioned possible options: integration of inductor (L), positioning of the switches of active filter (7), positioning of the switches of inverter (3) and positioning of capacitor (2') directly on the stator of electrical machine (4). Thus, the volume of the electrical system is limited to the volume of electrical source (S) and to the volume of electrical machine (4).

First Variant Embodiment Example

Simulations of the electrical system comprising the active filter (7) illustrated in FIG. 7, including a battery (5), an active filter (7) and an assembly of an inverter (3) and an electrical machine (4) have been performed. A low-capacity (100 µF) capacitor (2') is used. It should be noted that, with such a capacity, the prior art approach leads to instability.

A first simulation has been conducted, wherein the leakage inductance due to wire windings were assumed to be low (a few µH), which ensures stability of the system. The results are given in FIG. 8.

Figure 8:
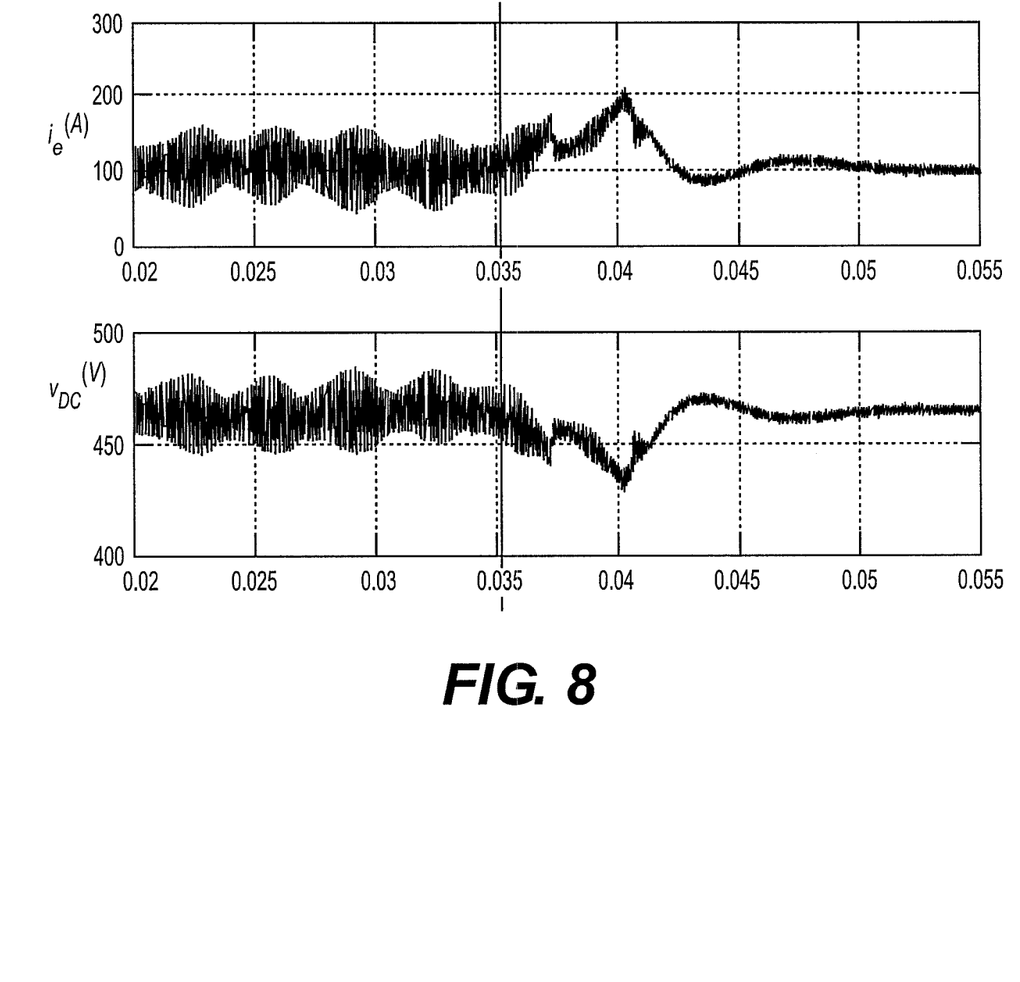
FIG. 8 illustrates a time response of the system according to the first alternative embodiment of the invention.

From t=0.035 s, the active filter is activated; permitting confinement of the dc bus voltage and of the source current within a hysteresis band of specified width. The filter allows the variations due to the inverter modulation to be eliminated.

Figure 9:
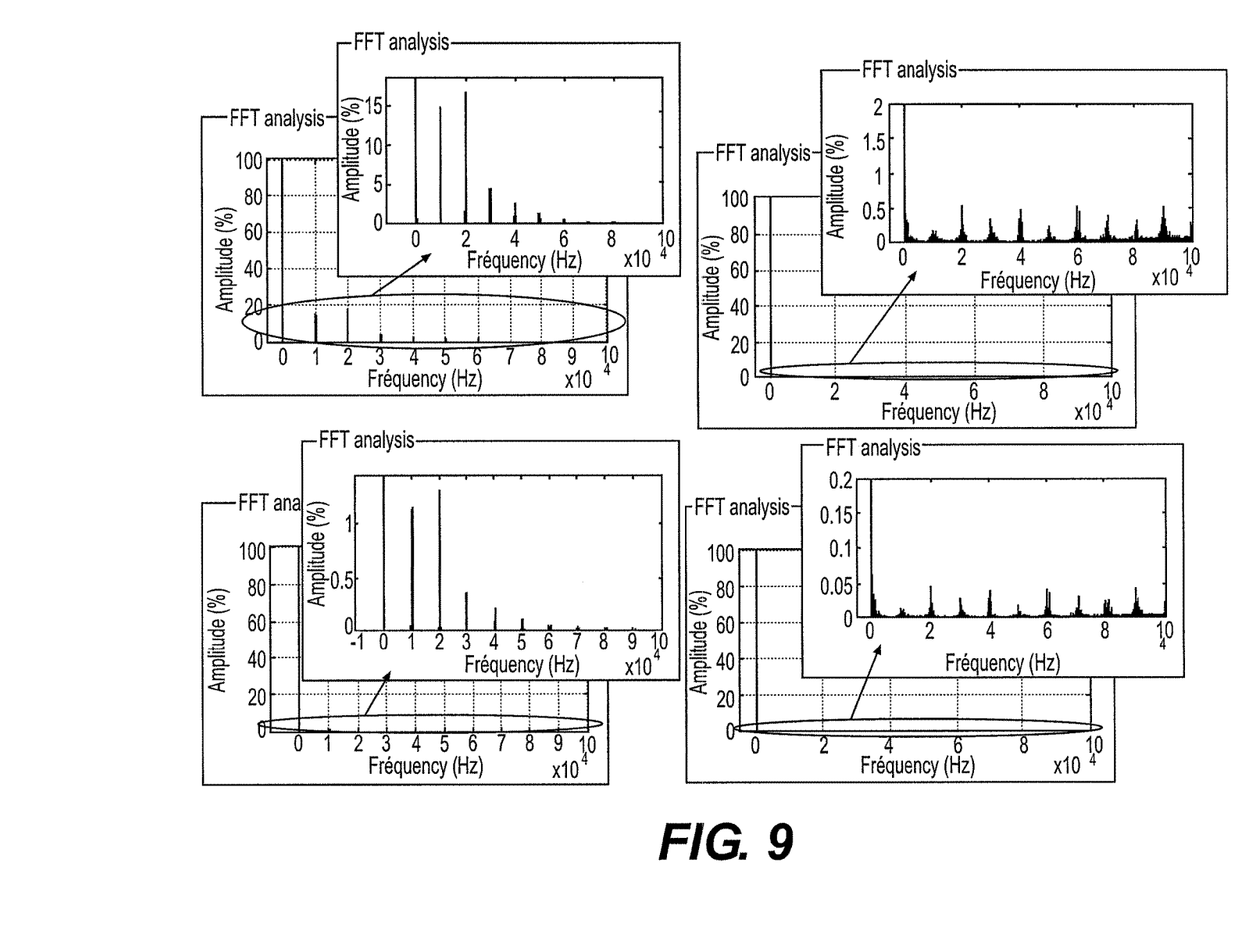
FIG. 9 illustrates a frequency response of the system according to the first alternative embodiment of the invention.

The results of FIG. 9 show how the filter acts upon the frequency spectrums of the quantities of FIG. 8 (source current $i_e$ and dc bus voltage $v_{DC}$). The inverter switching frequency ($f_d$) is 10 kHz in order to obtain 50 Hz signals on the alternating side (f). The modulation caused by PWM provides spectral lines at the following frequencies: 9.85 kHz, 10.15 kHz, 20 kHz, 29.85 kHz, 30.15 kHz, 40 kHz, etc., corresponding to $(2n+1)f_d \pm 3f$ and $(2n)f_d \pm 6f$ with n being the harmonic number.

The active filter activation causes spectrum spreading and very predominantly keeps the continuous component. The maximum harmonic amplitudes for source current $i_e$ and bus voltage $v_{DC}$ respectively remain below 0.5% and 0.05% of the "fundamental" whereas they were 17% and 1.25% prior to filter activation. These results are comparable in objective to those obtained on the alternating side when using particular PWM techniques (hysteresis or random space vector modulation RSVM).

Figure 10A:
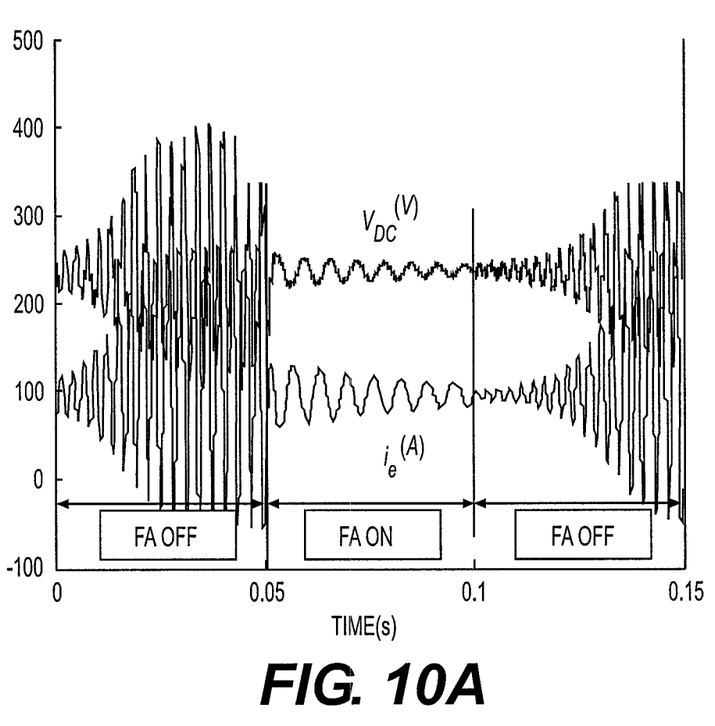
FIGS. 10a) and 10b) illustrate another time response of the system according to the first alternative embodiment of the invention where wire inductance is not negligible.
Figure 10B:
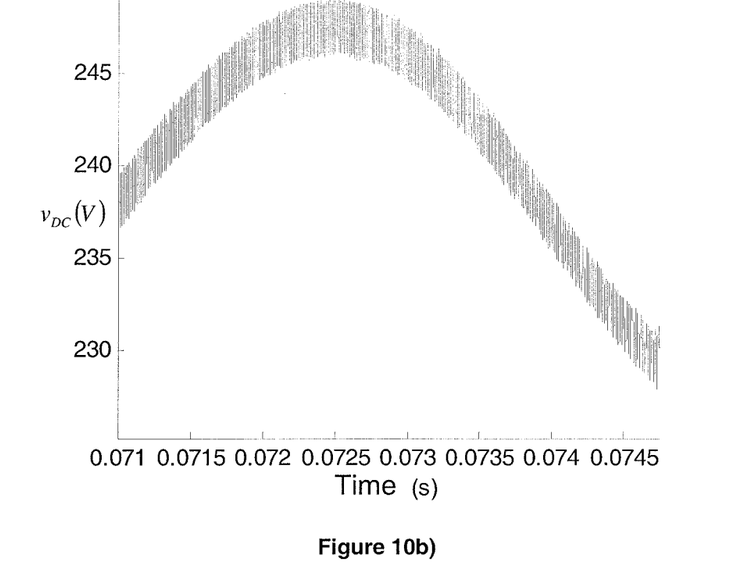

A second simulation was carried out, wherein the wire winding inductance is no longer negligible (installation on board a plane or a train for example), which generates an unstable behavior of the system. The effect of active filter (7) on the system stability is illustrated in FIGS. 10a) and 10b). At t=0.05 s, the active filter is activated and deactivated at t=0.1 s. Without an active filter, the system becomes unstable causing divergence of source current $i_e$ and dc bus voltage $v_{DC}$ from their operating point. Activation of active filter (7) provides stabilization of the system whose efficiency is apparent from the convergence. As soon as the active filter is deactivated, the unstable state recurs.

Variant Embodiments

The additional embodiments described hereafter can be implemented alone, in combination with the first embodiment or in combination with the other additional embodiments.

In the embodiment illustrated in FIG. 7, another type of switch is used in inverter (3) and active filter (7), which includes a diode and a transistor. For example, it can be an IGBT (insulated gate bipolar transistor) associated in series with a diode. This type of switch can be controlled and it affords the advantage of being fast and therefore is suited for use in a method of converting a continuous electrical energy to an alternating electrical energy.

In an additional embodiment, control of the active filter is achieved in an analog manner to simplify implementation of the control. In this embodiment, operational amplifiers, resistors, capacitors and potentiometers are used for controlling the active filter.

Figure 11:
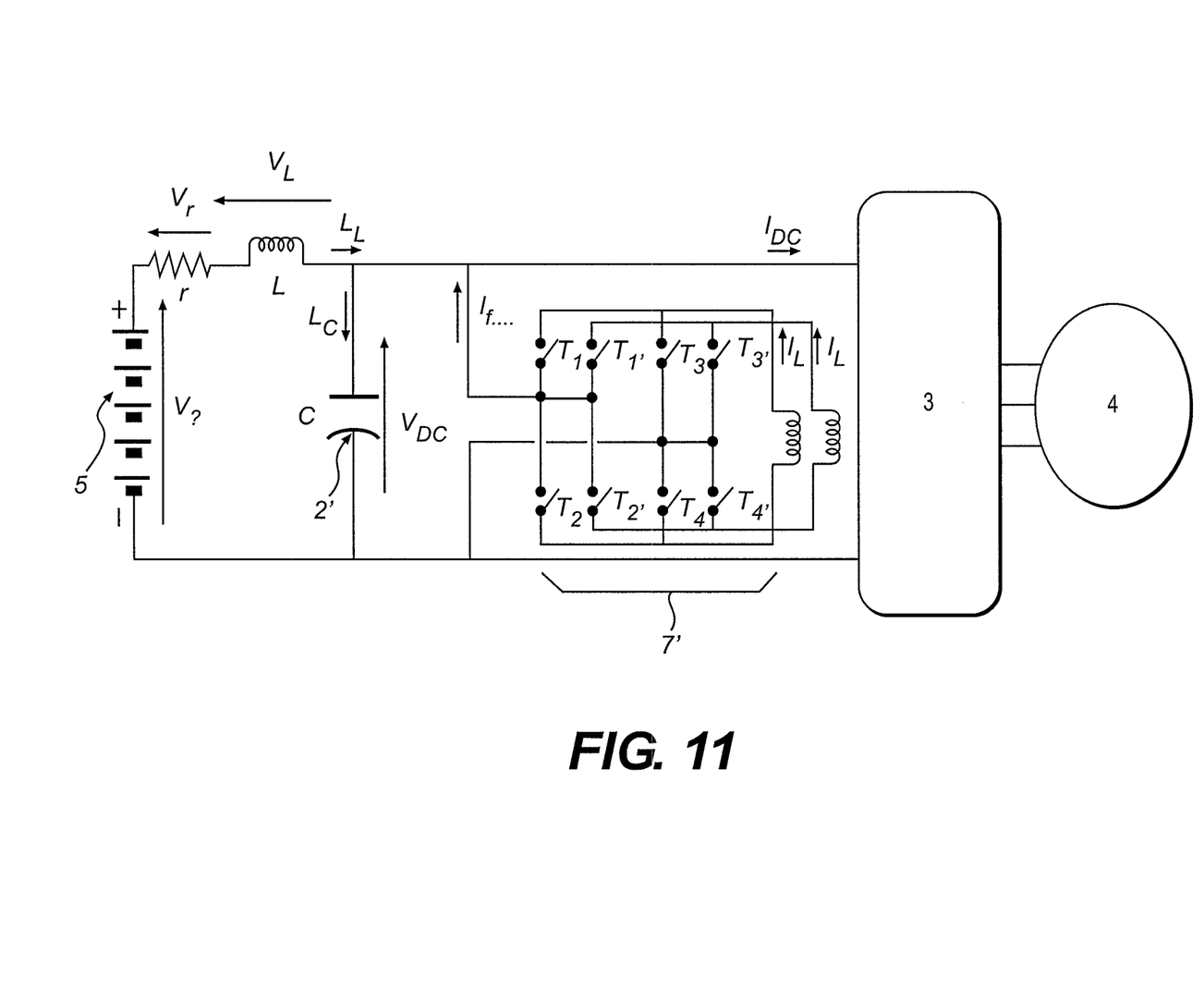
FIG. 11 shows a second alternative embodiment of the invention.
Figure 12:
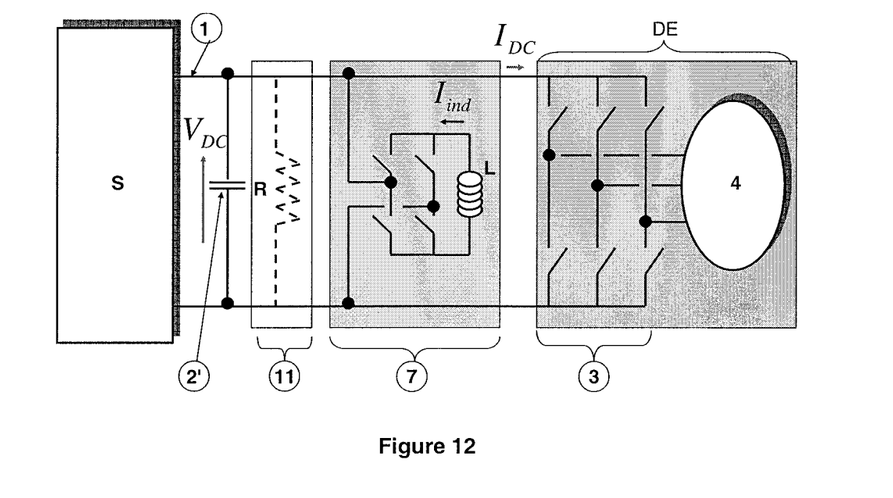
FIG. 12 shows a third alternative embodiment of the invention.

In order to decrease the size of the active filter reducing the size of inductor (L) is considered as used in the first embodiment. However, the size reduction of inductor (L) is limited by the value of the current flowing therethrough. FIG. 11 therefore provides a second additional embodiment for the active filter (7') allowing the inducing current to be reduced. Inducing current reduction is possible through a modification of the initial topology to be segmented at the input of active filter means (7'). The active filter means (7') has eight controlled switches (T1 to T4 and T1' to T4') forming two H bridges and of two inductors (L), arranged respectively in parallel with one of the bridges. The switches are controlled in the same way as in the first additional embodiment described above. The current flowing through each inductance is thus equal to half the value that is to be theoretically injected (or absorbed) on the dc bus. Control of the switches is thus duplicated. Advantageously, the two inductors (L) are inserted within electrical machine (4) close to the coils of electrical machine (4) and the eight switches (T1 to T4 and T1' to T4') are arranged on the stator of electrical machine (4).

Figure 13:
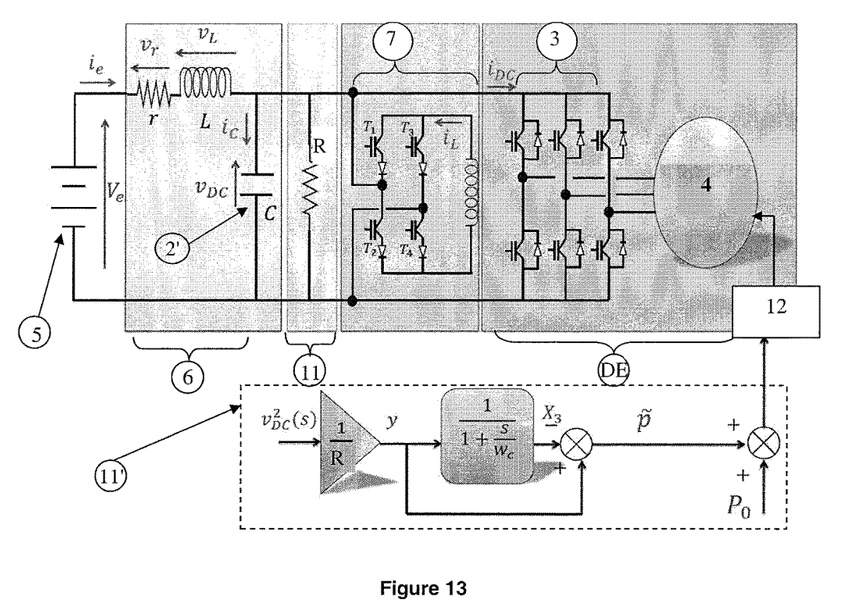
FIG. 13 shows a control of the third alternative embodiment of the invention.

Although the filter also acts to stabilize the system, it may be necessary to correct the low damping level to improve a rate of convergence of the quantities. Indeed, although they are confined as shown in FIG. 10b), the quantities converge by slightly damped oscillations. In a preferred additional embodiment of the invention, illustrated in FIG. 12, improvement of the rate of convergence of the quantities is achieved using dynamic stabilization means (11) that can correspond to a feedback loop (11') in the control of electrical machine (4). This stabilization can be obtained by adding a "virtual" damping. The goal is to virtually introduce the behavior of a resistor R (11) that would be directly arranged in parallel with dc bus capacitor (2') and the active filter as shown in the diagram of FIG. 13. The use of a virtual resistor is notably described in the document as follows:

Ahmed-Bilal AWAN and Babak NAHID-MOBARAKEH. "Nonlinear Stabilization of a DC-Bus Supplying a Constant Power Load". IEEE, 2009.

The concept is to generate power proportional to the square of the fluctuations of the dc bus voltage $$\tilde{p} = \frac{v_{DC}^2}{R}.$$

The power $\tilde{p}$ is then added to the nominal power $P_0$ of the electrical device that adjusts its power demand according to the more or less great voltage fluctuations. The power $\tilde{p}$ is used in control (12) of electrical device (DE), for example electrical machine (4), for adjusting the behavior of electrical device (DE) to prevent oscillations in the dc bus. Thus, the current and dc bus voltage fluctuations are avoided by the control of electrical device (DE). The combination of virtual resistor (11) and active filter (7) is an efficient way to ensure stability and improve the electrical energy quality. In an embodiment illustrated in FIG. 13, the dynamic stabilization means has a gain $$\frac{1}{R}$$

with R being the value of virtual resistor (11), and of a low-pass filter. In this scheme, the common bus comprises a resistor R and an inductor L used for modelling the internal resistance and inductance (wire winding inductance) of the connections and of battery (5).

Figure 14A:
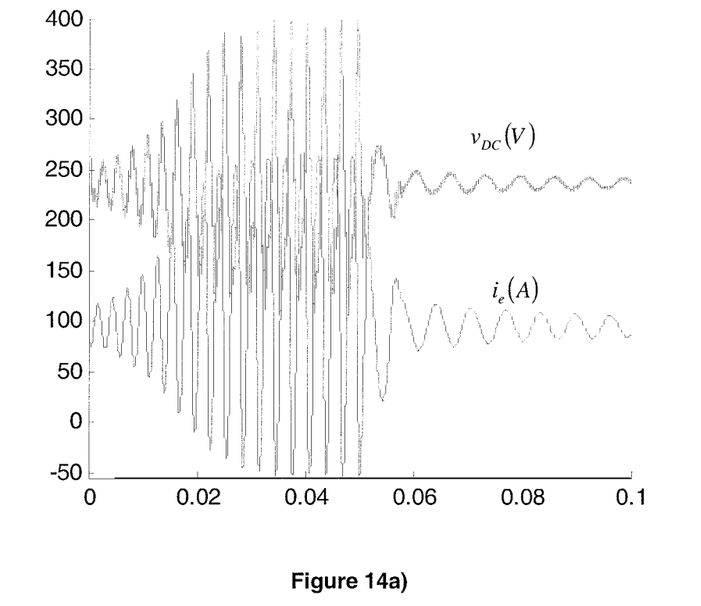
FIGS. 14a) and 14b) illustrate time responses for the first alternative embodiment of the invention.
Figure 14B:
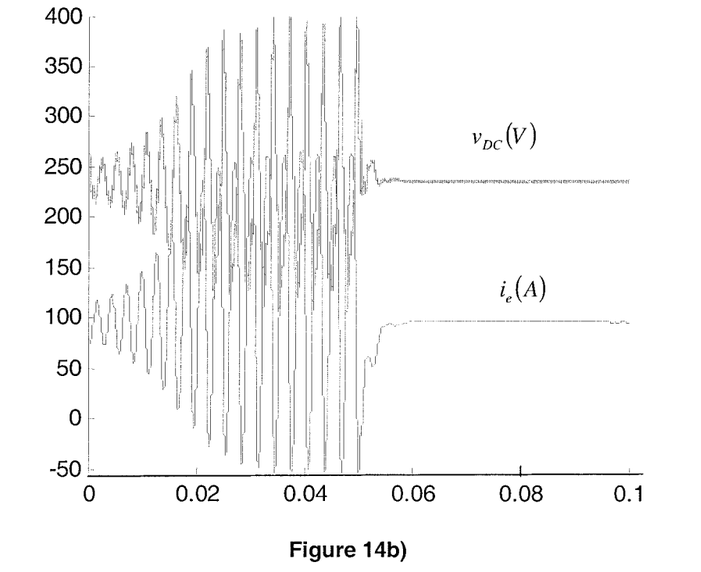

Stabilization through active filter (7) with and without virtual resistor (11) is illustrated in FIGS. 14a) and 14b). FIG. 14a) shows the behavior of an electrical system according to the first additional embodiment with an active filter (7) alone and FIG. 14b) shows the behavior of an electrical system according to a third additional embodiment with an active filter means (7) associated with dynamic stabilization means (11). Adding a supplementary damping via the virtual resistor allows the quantities to converge without oscillations. It is therefore interesting to associate active filtering with a dynamic stabilization method when it is applied to an unstable system, that is after a substantial reduction of the dc bus capacitor in relation to the solutions of the prior art.

Figure 15:
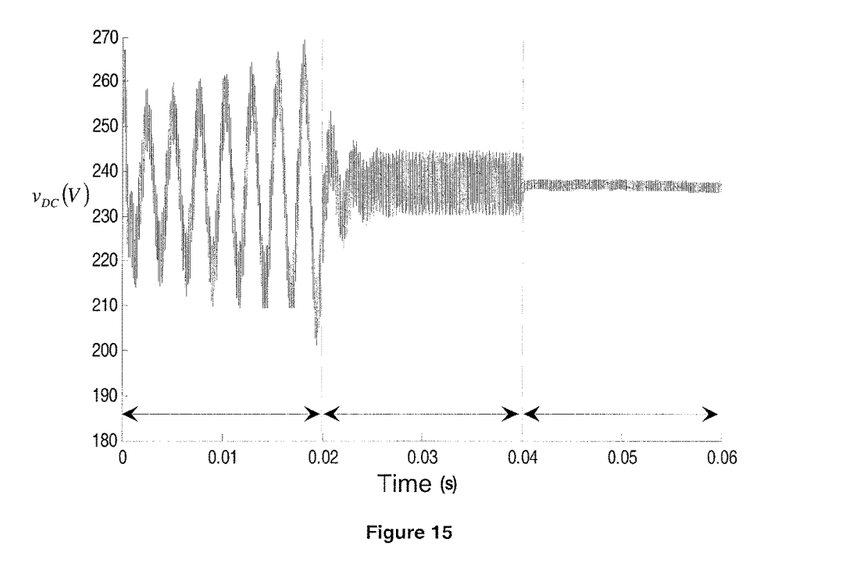
FIG. 15 illustrates time responses for the third alternative embodiment of the invention.

The role of the active filter and of the virtual resistor is shown in detail in FIG. 15. Without a stabilizing system (from t=0 s to t=0.02 s), the substantial capacitor reduction leads to an unstable behavior of the system. At t=0.02 s, activation of the virtual resistor alone involves convergence of the bus voltage, but the fluctuations caused by the inverter modulation remain unchanged. They are eliminated upon activation of the active filter at t=0.04 s. The bus voltage is thus controlled even though the bus capacitor is reduced.

This additional embodiment of the invention is an interesting embodiment as a result of reducing the passive elements, which improves the dc bus energy quality and reduces the constraints on the on-board energy source (battery). Furthermore, the reduction of the constraints on on-board energy source (S) allows the life thereof to be increased. This additional embodiment ensures a good quality of electrical energy and prevents the system from switching into an unstable state through control and confinement of the electrical quantities of the dc bus. The combination of the active filter and of the dynamic stabilization is efficient for decreasing the constraints linked with the weight and the volume (size) of the capacitors. For example, in the car industry, the capacities currently used are of the order of 3000 μF. The invention allows this value to be reduced to about ⅙ with a 500 μF capacitor being sufficient.

The invention is thus adaptable to any type of on-board system and therefore to the aforementioned fields of the car industry, railway construction, shipbuilding and aircraft industry.

The invention claimed is:

1. An electrical system comprising:
at least one continuous power electrical energy source, at least one battery powered electrical machine connected to the at least one continuous power electrical energy source by an electrical bus, a capacitor connected to the electrical bus and which provides filtering to reduce bus voltage fluctuations and is connected in parallel with the at least one battery powered electrical machine, a controlled active filter connected to the electrical bus, disposed between the at least one continuous power electrical energy source and the at least one battery powered electrical machine, for providing or absorbing fluctuations of current provided by the at least one continuous power electrical energy source and for reducing fluctuations of voltage at terminals of the at least one continuous power electrical energy source; and wherein
the controlled active filter comprises an inverter and is integrated within a stator of the at least one battery powered electrical machine.

2. An electrical system as claimed in claim 1, wherein the capacitor is disposed on the at least one battery powered electrical machine.

3. An electrical system as claimed in claim 2, wherein the inverter comprises controlled switches disposed within the stator of the at least one battery powered electrical machine.

4. An electrical system as claimed in claim 3, wherein the controlled active filter includes four controlled switches in an H bridge and an inductor in parallel with the H bridge and integrated within the stator of the at least one battery powered electrical machine.

5. An electrical system as claimed in claim 3, wherein the controlled active filter includes eight controlled switches disposed in two H bridges and two inductors respectively arranged in parallel with a different one of the H bridges and integrated within the at least one battery powered electrical machine.

6. An electrical system as claimed in claim 2, wherein the controlled active filter includes four controlled switches in an H bridge and an inductor in parallel with the H bridge and integrated within the stator of the at least one battery powered electrical machine.

7. An electrical system as claimed in claim 2, wherein the controlled active filter includes eight controlled switches disposed in two H bridges and two inductors respectively arranged in parallel with a different one of the H bridges and integrated within the at least one battery powered electrical machine.

8. An electrical system as claimed in claim 7, wherein the eight controlled switches are controlled by two feedback loops comprising a high-pass filter and a regulator with each feedback loop controlling two of the controlled switches.

9. An electrical system as claimed in claim 8, wherein the regulator is a hysteresis comparator.

10. An electrical system as claimed in claim 2, wherein the controlled active filter is connected in parallel with the capacitor.

11. An electrical system as claimed in claim 1, wherein the inverter comprises controlled switches disposed within the stator of the at least one battery powered electrical machine.

12. An electrical system as claimed in claim 11, wherein the controlled active filter includes four controlled switches in an H bridge and an inductor in parallel with the H bridge and integrated within the stator of the at least one battery powered electrical machine.

13. An electrical system as claimed in claim 11, wherein the controlled active filter includes eight controlled switches disposed in two H bridges and two inductors respectively arranged in parallel with a different one of the H bridges and integrated within the at least one battery powered electrical machine.

14. An electrical system as claimed in claim 11, wherein the controller active filter is connected in parallel with the capacitor.

15. An electrical system as claimed in claim 1, wherein the controlled active filter includes four controlled switches in an H bridge and an inductor in parallel with the H bridge and integrated within the stator of the at least one battery powered electrical machine.

16. An electrical system as claimed in claim 15, wherein the four controlled switches are controlled by two feedback loops comprising a high-pass filter and a regulator with each feedback loop controlling two of the four controlled switches.

17. An electrical system as claimed in claim 16, wherein the regulator is a hysteresis comparator.

18. An electrical system as claimed in claim 17, wherein the controlled active filter is connected in parallel with the capacitor.

19. An electrical system as claimed in claim 15, wherein the controlled active filter is connected in parallel with the capacitor.

20. An electrical system as claimed in claim 16, wherein the controlled active filter is connected in parallel with the capacitor.

21. An electrical system as claimed in claim 1, wherein the controlled active filter includes eight controlled switches disposed in two H bridges and two inductors respectively arranged in parallel with a different one of the H bridges and integrated within the at least one battery powered electrical machine.

22. An electrical system as claimed in claim 21, wherein the eight controlled switches are controlled by feedback loops comprising a high-pass filter and a regulator with each of the feedback loops controlling two of the eight controlled switches.

23. An electrical system as claimed in claim 22, wherein the regulator is a hysteresis comparator.

24. An electrical system as claimed in claim 21, wherein the controlled active filter is connected in parallel with the capacitor.

25. An electrical system as claimed in claim 1, wherein the controlled active filter is connected in parallel with the capacitor.

26. An electrical system as claimed in claim 1, wherein the controlled active filter is controlled by a sign of the fluctuations of current and the fluctuations of voltage.

27. An electrical system as claimed in claim 1, wherein the active filter comprises means for providing dynamic stabilization of current provided by the at least one continuous electrical energy source and voltage at terminals of the at least one continuous electrical energy source.

28. An electrical system as claimed in claim 27, wherein the means for providing dynamic stabilization comprises a feedback loop which controls the at least one battery powered electrical machine and provides a resistance in parallel with the capacitor and the controlled active filter.

29. An electrical system as claimed in claim 28, wherein the feedback loop includes a low-pass filter.

30. An electrical system in accordance with claim 1 comprising a hybrid or an electrical vehicle.

* * * * *